(12) United States Patent
Weber

(10) Patent No.: US 9,411,050 B1
(45) Date of Patent: Aug. 9, 2016

(54) GLOBAL POSITIONING SYSTEM DEVICE FOR PROVIDING POSITION LOCATION INFORMATION TO A SMART DEVICE

(71) Applicant: Matthew L. Weber, Cedar Rapids, IA (US)

(72) Inventor: Matthew L. Weber, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 751 days.

(21) Appl. No.: 13/714,408

(22) Filed: Dec. 14, 2012

(51) Int. Cl.
*G01S 19/13* (2010.01)
*H04W 4/02* (2009.01)
*H04M 1/725* (2006.01)

(52) U.S. Cl.
CPC ............. *G01S 19/13* (2013.01); *H04M 1/725* (2013.01); *H04W 4/02* (2013.01)

(58) Field of Classification Search
CPC ......... G01S 19/13; H04M 1/725; H04W 4/02
USPC .................................................... 342/357.51
See application file for complete search history.

(56) References Cited

U.S. PATENT DOCUMENTS

| | | | |
|---|---|---|---|
| 6,912,397 B2* | 6/2005 | Liou | G01S 5/0018 342/357.32 |
| 7,810,729 B2 | 10/2010 | Morley, Jr. | |
| 2002/0176330 A1* | 11/2002 | Ramonowski | G11B 31/00 369/30.36 |
| 2011/0205111 A1* | 8/2011 | Balardeta | A63B 24/0003 342/357.57 |
| 2011/0275389 A1* | 11/2011 | Paulson | G01S 19/48 455/456.3 |

OTHER PUBLICATIONS

Karch, M. "10 Quick Google Maps Tricks", Jan. 28, 2009, http://google.about.com/od/mapsanddirections/tp/10-Quick-Google-Maps-Tricks.htm.*
Elechouse, SoftModem for Arduino, Audio Jack Modem for iPhone and Android, Webpages from Elechouse catalog downloaded on Dec. 12, 2012 from http://www.elechouse.com/elechouse/index.php?main_page=product_info&cPath=90_92&products_id=2199, pp. 1-6.
Energy Micro, EFM 32—Connect the EFM32 with a Smart Phone through the Audio Jack; Application Note AN0054_Rev1.01 dated Nov. 12, 2012 downloaded from http://cdn.energymicro.com/dl/an/pdf/an0054_efm32_phone_audio_jack_interface.pdf on Dec. 12, 2012, pp. 1-19.

* cited by examiner

*Primary Examiner* — Frank J McGue
(74) *Attorney, Agent, or Firm* — Angel N. Gredzhikov; Donna P. Suchy; Daniel M. Barbieri

(57) ABSTRACT

A global positioning system (GPS) device for providing position location information (PLI) to a smart device includes a GPS receiver; a signal interpreting device; and, a GPS device interface. The GPS receiver receives satellite signals and derives PLI. The signal interpreting device utilizes the derived PLI to provide an analog audio signal. The GPS device interface is configured to receive the analog audio signal. The GPS device interface is adapted for use with an audio interface of a smart device to transmit the analog audio signal to the smart device.

16 Claims, 2 Drawing Sheets

GLOBAL POSITIONING SYSTEM DEVICE FOR PROVIDING POSITION LOCATION INFORMATION TO A SMART DEVICE

BACKGROUND OF THE INVENTION

1. Field of the Invention

The present invention relates generally to global positioning system (GPS) smartphone accessories and more particularly to a GPS device external to a smart device adapted for use with the audio interface of the smart device.

2. Description of the Related Art

Although current, conventional smart devices generally have an internal GPS module, such internal GPS modules are deficient for various applications requiring enhanced navigation capabilities. For example, there are conditions where the internal GPS module is denied (spoofed/jammed) or the internal GPS module needs to be augmented, i.e. inside a building.

Providing an external GPS device for use with a conventional smart device is problematic. The effort usually involves costly software modification to every conventional smart device model to provide functionality. The effort also usually requires a set of elaborate custom cable(s) based on the connector and power configuration of the smart device being connected.

Using a cabled GPS device satisfies product requirements for cases where a wireless connectivity method isn't available for security or reliability concerns. A specific example may be military use of a commercial smart device and integration with an external GPS. There are other cabled options which don't use an audio interface for smart device interfacing; each bringing additional cost and modifications to a stock smart device. This defeats the commercial off the shelf qualities of the smart device. Through fewer smart device modifications, the overall reliability and quality of the solution improves, allowing the use of common software frameworks. One example is the use of the Android Software Development Kit and the portability across all Android devices.

It is known that the audio port of a smart phone can be used as a serial port as discussed in, for example, a) ELECHOUSE, SoftModem for Arduino, Audio Jack Modem for iPhone and Android, Webpages from Elechouse catalog downloaded on Dec. 12, 2012 from http://www.elechouse.com/elechouse/index.php?main_page=product_info&cPath=90_92& products_id=2199, pages 1-6; and, b) ENERGY MICRO, EFM 32—Connect the EFM32 with a Smart Phone through the Audio Jack; Application Note AN0054_Rev1.01 dated 2012 Nov. 12 downloaded from http://cdn.energymicro.com/dl/an/pdf/an0054_efm32_phone_audio_jack_interface.pdf on Dec. 12, 2012, pages 1-19.

SUMMARY OF THE INVENTION

In a broad aspect, the present invention is a global positioning system (GPS) device for providing position location information (PLI) to a smart device. It includes a GPS receiver; a signal interpreting device; and, a GPS device interface. The GPS receiver receives satellite signals and derives PLI. The signal interpreting device utilizes the derived PLI to provide an analog audio signal. The GPS device interface is configured to receive the analog audio signal. The GPS device interface is adapted for use with an audio interface of a smart device to transmit the analog audio signal to the smart device.

In one preferred embodiment the signal interpreting device comprises a digital to analog converter (DAC) and analog to digital converter (ADC), both paired with a processor, to produce and consume respectively, an audio stream, the audio stream being the analog audio signal.

In another embodiment the signal interpreting device comprises a digital to analog converter (DAC) paired with a processor to produce an audio stream, the audio stream being the analog audio signal.

In another embodiment the global positioning system (GPS) device interface further includes an audio connector connectable to the smart device.

The present invention has various advantages over traditional cabled smart device GPS solutions. There is no major impact to Smart device battery life or processing requirements. It may utilize an unmodified stock Android, Apple, or similar smart device. A specialized cable and smart device hardware modifications are not required. Through the use of a standard audio interface, software development can leverage existing phone and media player audio frameworks for creation of portable smart device applications. The applications would leverage the GPS device data for enhanced navigation. The existing audio frameworks would also allow the concept of predefined audio streams (podcasts) that could be "played back" to provide request, acknowledgement, GPS device reprogramming, and other data transmission to the GPS device.

Other objects, advantages, and novel features will become apparent from the following detailed description of the invention when considered in conjunction with the accompanying drawings.

DETAILED DESCRIPTION OF THE INVENTION

Figure 1:
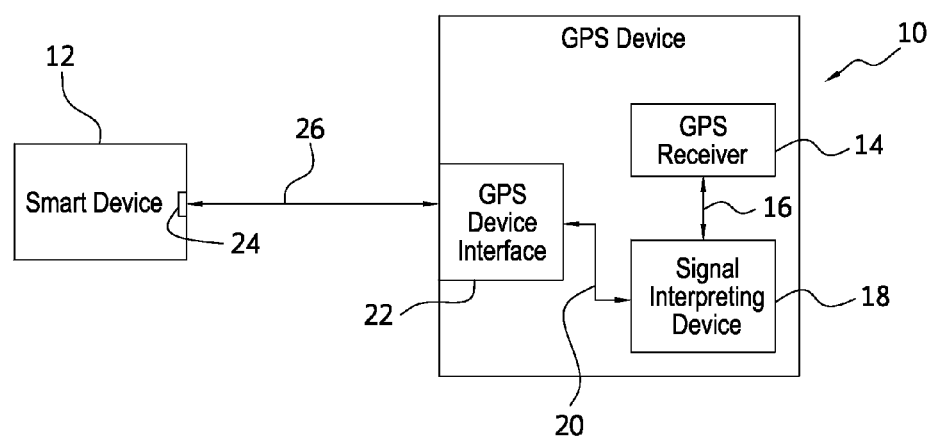
FIG. 1 is a schematic diagram of the global positioning system (GPS) device of the present invention connected with a smart device.

Referring now to the drawings and the characters of reference marked thereon, FIG. 1 illustrates the global positioning system (GPS) device, designated generally as 10, for providing position location information (PLI) to a smart device 12. The device 10 includes a GPS receiver 14 for receiving satellite signals and deriving PLI 16. A signal interpreting device 18 utilizes the derived PLI 16 to provide an analog audio signal 20. A GPS device interface 22 is configured to receive the analog audio signal. The GPS device interface 22 is adapted for use with an audio interface 24 of the smart device 12 to transmit the analog audio signal to the smart device 12. As used herein the term "position location information" (PLI) is broadly defined as the navigation coordinates signifying a user's location. PLI may include, for example, a set of data comprising latitude, longitude, azimuth, accuracy, altitude, speed, and/or time. (A typical implementation includes all of these parameters.)

The GPS receiver 14 may, for example, utilize a military or commercial GPS receiver that connects internally as an embedded module or through an external connection. The GPS receiver could comprise, for example, a GPS receiver from u-blox Holding AG (Switzerland) (e.g., LEA Series, Max Series), Garmin Ltd. (e.g. Foretrex, Rino, eTrex, GPS-MAP) or Rockwell Collins, Inc. (e.g., Miniature PLGR Engine—Selective Availability Antispoofing Module (SAASM) Type II (MPE-S Type II), Miniature PLGR Engine SAASM (MPE-S), Polaris™Link, Micro GPS Receiver Application Module (MicroGRAM), HNV-660 Defense Advanced GPS Receiver (DAGR)).

The signal interpreting device 18 is preferably a digital to analog converter (DAC) and analog to digital converter (ADC), both paired with a processor, to produce and consume an audio stream, the audio stream being the analog audio signal. However, it may be a purely analog circuit suitable for converting an audio stream to or from the GPS receiver. Another possibility may be solely a digital to analog converter (DAC) paired with a processor to produce an audio stream, said audio stream being said analog audio signal. The processor may be from, for example, Texas Instruments, Inc. (TI) (e.g., MSP430 Mixed Signal Processor, Stellaris Cortex-M3/4 MicroController), STMicroelectronics (e.g., STM32 Cortex-M3/4 MicroController), or an FPGA such as manufactured by Actel Corp., Altera Corp., or Xilinx, Inc. The DAC and/or ADC may be from, for example, Analog Devices, Inc. or TI. The DAC and/or ADC may be internal to the selected processor or provided as a separate integrated circuit available from, for example, Analog Devices, Inc. or TI.

The GPS device interface 22 uses an audio connector 26 connectable to the smart device 12 through the smart device audio interface 24. The audio connector or jack 26 is adapted to be inserted into an audio interface, e.g. socket, such as a microphone input/line output of the smart device. The audio connector may be a TRS (tip, ring, sleeve) connector also known as an audio jack, phone plug, jack plug, stereo plug, mini-jack, or mini-stereo audio connector. The jack 26 may be formed of different sizes such as miniaturized versions that are 3.5 mm or 2.5 mm. It is also possible that the jack 26 may be retractable within the housing 10 or smart device 12.

The smart device 12 utilized may comprise any combination of components such as memory including flash ROM, SRAM, a camera, a battery, LCD driver, a display, an antenna, a speaker, a microphone, a USB On-The-Go (OTG) circuit, a Bluetooth circuit, and WIFI circuitry. The flash ROM may contain programs, applications, and/or an operating system for the smart device 12. In the optimal case, the operating system is unmodified to support the audio interface to the GPS device 10. For example, the smart device may be an unmodified (no rooting or boot-loader unlocking) stock Android or Apple iPhone/iPad.

Figure 2:
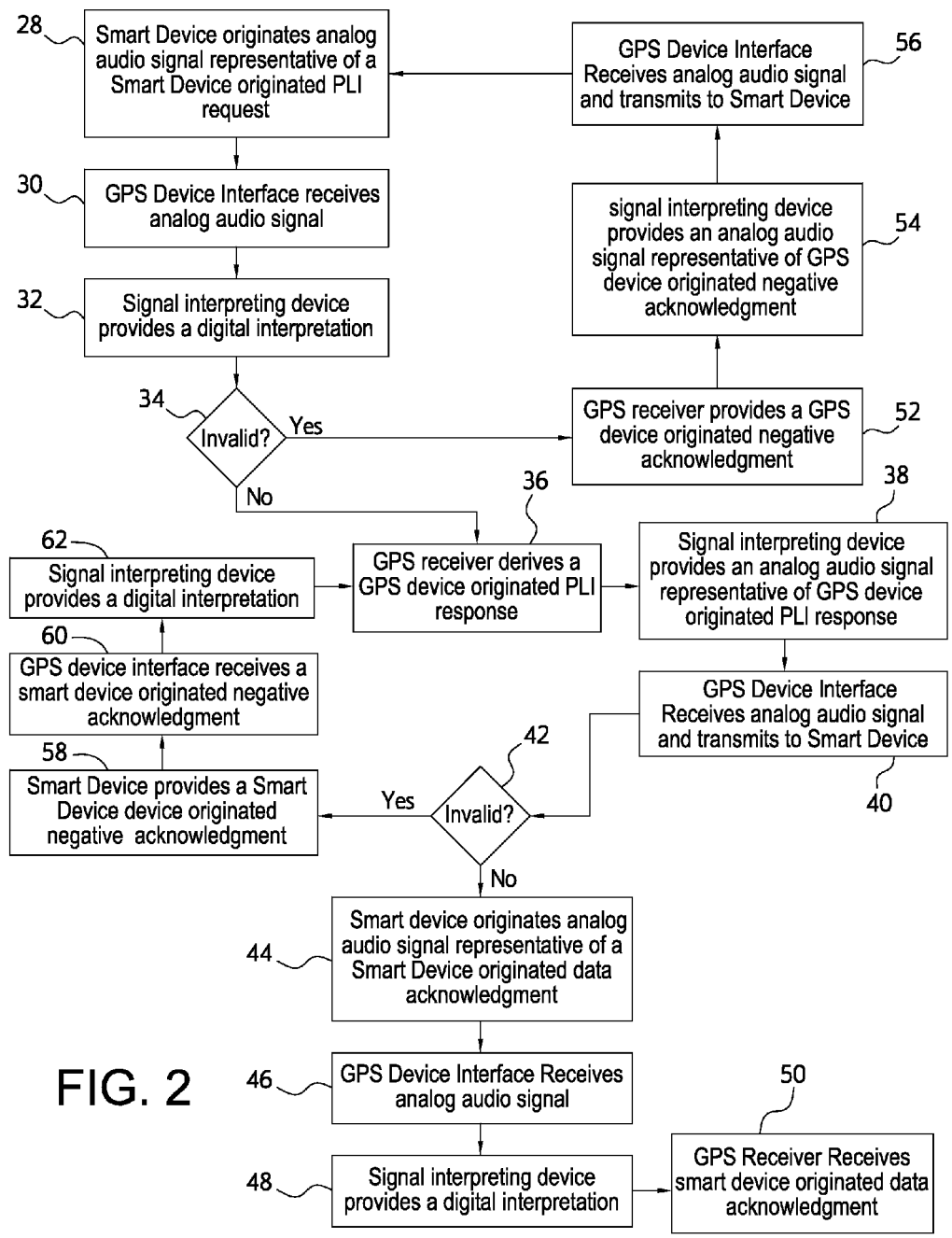
FIG. 2 is a flowchart of a method of operation of the global positioning system (GPS) device.

Referring now to FIG. 2, during use, in a preferred implementation of operation, the GPS device interface receives a smart device originated analog audio signal for use by the signal interpreting device to provide a digital interpretation of a smart device originated PLI request, as indicated by process blocks 28, 30, 32.

The GPS receiver determines if the digital interpretation is invalid, as indicated by decision block 34. If the digital interpretation is not invalid, the GPS receiver derives a GPS device originated PLI response from the digital interpretation (process block 36). The GPS device originated PLI response is utilized by the signal interpreting device to provide an analog audio signal representative of the GPS device originated PLI response for reception by the GPS device interface and transmission to the smart device (process blocks 38, 40).

If the smart device determines the transmission to the smart device is not invalid (decision block 42), then the GPS device interface receives a smart device originated analog audio signal (process blocks 44, 46). The signal interpreting device uses that smart device originated analog audio signal to provide a digital interpretation of a smart device originated data acknowledgement (process block 48). The GPS receiver receives the smart device originated data acknowledgement (process block 50).

Relative to the above steps, if the digital interpretation of a smart device originated PLI request is invalid (decision block 34), then the following takes place: The GPS receiver derives a GPS device originated negative acknowledgement from the interpreted smart device originated PLI request (process block 52). The GPS device originated negative acknowledgement is utilized by the signal interpreting device to provide an analog audio signal representative of the GPS device originated negative acknowledgement for reception by the GPS device interface (process block 54). That analog audio signal is transmitted to the smart device (process block 56).

If the digital interpretation of a GPS originated PLI response is invalid (decision block 42), then the following takes place: The GPS device interface receives a smart device originated negative acknowledgment analog audio signal for use by the signal interpreting device to provide a digital interpretation of the smart device originated negative acknowledgment for reception by the GPS receiver (process blocks 58, 60, 62).

A possible example specific implementation may include a smart device connecting to the GPS device utilizing an audio port sampling at 48 kHz. The audio samples may contain a modulated (e.g amplitude, phase, or frequency) serial protocol emulating a 4800 bps (8n1n) serial connection. The modulation may additionally use a type of data encoding (e.g. Manchester) to improve data integrity. All serial data may have a defined packet format, which includes a CRC-32 to protect the data integrity and use acknowledgements to request a reattempt if a packet was corrupt. Smart device packets may be generated by a smart device application creating an audio sample buffer with the necessary representation of the serial bit stream at the 4800 bps rate. For power savings, the GPS Device may sleep until the first serial packet is detected and then resume sleeping after the final acknowledgement. The GPS Device may use a low power MicroController to perform the functions of the signal interpreting device. The MicroController would produce/consume the packets of data.

Figure 3:
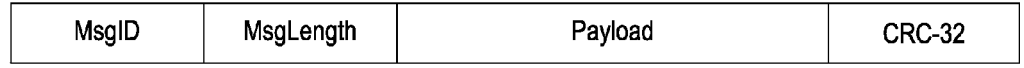
FIG. 3 is an illustration of an example of a data packet.

As an example, a packet may be defined as a MsgID, MsgLength, Payload, and CRC-32, as illustrated in FIG. 3, designated generally as 64. A unique MsgID may be selected for each type of message (PLI request, PLI response, Acknowledgement (ACK)/Negative Acknowledgement (NAK)). The simplest form of a packet (PLI Request & ACK/NAK) may contain a MsgID (4 bytes), MsgLength (4 bytes), no Payload (0 bytes), and a CRC-32 (4 bytes) for a total of 12 bytes. The PLI Response message may contain a Payload structure including a Key Status (integer—4 bytes), Latitude (double—8 bytes), Longitude (double—8 bytes), Azimuth (single float—4 bytes), Altitude (single float—4 bytes), Horizontal Accuracy (single float—4 bytes), Vertical Accuracy (single float—4 bytes), Speed (single float—4 bytes), and GPS Time (long—8 bytes) for a total of 42 bytes.

An example high-level processing sequence between a smart device and the GPS device may be as follows. The smart device can be considered the "Master" and the GPS device the "Slave". The Master requests a PLI update using a packet with a specific MsgID and a valid CRC-32. The Slave receives the packet and verifies the CRC-32. The Slave sends an ACK to the Master that it received the packet. The Slave then performs action based on the MsgID. If the MsgID was a PLI Request, a new packet is constructed with the PLI data and the correct MsgID. The Slave sends the PLI Response packet to the Master. The Master verifies the packet CRC-32 is correct and processes the data based on the MsgID. The Master sends an ACK to the Slave that it received the packet. If the packet was a PLI Response, the Master uses the newly received PLI data. If the Master or Slave at any point detected an invalid CRC-32, the normal ACK is instead sent as a NAK to request a retransmission of the previous packet. The ACK/NAK process may also have some additional time-outs defined to prevent the Master/Slave from waiting forever when a packet is lost.

The inventive concepts herein can be implemented for a variety of potential applications. For example, the global positioning system (GPS) device may be used as a navigation aid for smoke jumpers, targeting and GPS denied navigation for ground based military use, reliable navigation for border patrol & narcotics operations, and for other users requiring a smart device (phone/tablet) based secure reliable navigation aid.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), General Purpose Processors (GPPs), Microcontroller Units (MCUs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Other embodiments and configurations may be devised without departing from the spirit of the invention and the scope of the appended claims.

The invention claimed is:

1. A global positioning system (GPS) device for providing position location information (PLI) to a smart device, comprising:
    a) a GPS receiver for receiving satellite signals and deriving PLI;
    b) a signal interpreting device for utilizing said derived PLI to provide a GPS originated analog audio signal, said signal interpreting device comprising a digital to analog converter (DAC) to produce said GPS originated analog audio signal and an analog to digital converter (ADC) to consume a smart device originated analog audio signal; and,
    c) a GPS device interface configured to receive said GPS originated analog audio signal, said GPS device interface connected via an audio connector adapted for use with an audio interface of a smart device to directly transmit said GPS originated analog audio signal to the smart device.

2. The global positioning system (GPS) device of claim 1, wherein said GPS device interface is adapted to receive said smart device originated analog audio signal from said smart device, said smart device originated analog audio signal being converted to a smart device originated PLI request.

3. The global positioning system (GPS) device of claim 1, wherein said GPS device interface is adapted to receive said smart device originated analog audio signal from said smart device, said smart device originated analog audio signal being converted to a smart device originated data acknowledgement.

4. The global positioning system (GPS) device of claim 1, wherein said GPS device interface is adapted to receive said smart device originated analog audio signal from said smart device, said smart device originated analog audio signal being converted to a smart device originated PLI request and data acknowledgment.

5. The global positioning system (GPS) device of claim 1, wherein said global positioning system (GPS) device interface further includes said audio connector connectable to said smart device.

6. The global positioning system (GPS) device of claim 1, wherein said global positioning system (GPS) device interface further includes said audio connector connectable to said smart device, said audio connector comprising a 3.5 mm or 2.5 mm jack.

7. The global positioning system (GPS) device of claim 1, wherein an input associated with said smart device is the microphone/line in audio input.

8. The global positioning system (GPS) device of claim 1, wherein an output associated with said smart device is the line out audio output.

9. A global positioning system (GPS) device for providing position location information (PLI) to a smart device, comprising:
 a) a GPS receiver for receiving satellite signals and deriving PLI;
 b) a signal interpreting device for utilizing said derived PLI to provide a GPS originated analog audio signal, said signal interpreting device comprising a digital to analog converter (DAC) to produce said GPS originated analog audio signal and an analog to digital converter (ADC) to consume a smart device originated analog audio signal; and,
 c) a GPS device interface configured to receive said GPS originated analog audio signal, said GPS device interface connected via an audio connector adapted for use with an audio interface of a smart device to directly transmit said GPS originated analog audio signal to the smart device,
wherein during use:
 i) said GPS device interface receives said smart device originated analog audio signal for use by the signal interpreting device to provide a digital interpretation of a smart device originated PLI request;
 ii) the GPS receiver derives a GPS device originated PLI response from said digital interpretation, said GPS device originated PLI response being utilized by said signal interpreting device to provide said GPS originated analog audio signal representative of said GPS device originated PLI response for reception by said GPS device interface and transmission to said smart device; and
 iii) said GPS device interface receives a smart device originated analog audio signal for use by the signal interpreting device to provide a digital interpretation of a smart device originated data acknowledgement.

10. The global positioning system (GPS) device of claim 9, wherein if said digital interpretation of a smart device originated PLI request is invalid, then:
 the GPS receiver derives a GPS device originated negative acknowledgement from the interpreted smart device originated PLI request, said GPS device originated negative acknowledgement being utilized by said signal interpreting device to provide an analog audio signal representative of said GPS device originated negative acknowledgement for reception by said GPS device interface and transmission to said smart device.

11. The global positioning system (GPS) device of claim 9, wherein if said digital interpretation of a GPS originated PLI response is invalid, then:
 said GPS device interface receives a smart device originated negative acknowledgment analog audio signal for use by the signal interpreting device to provide a digital interpretation of the smart device originated negative acknowledgment for reception by said GPS receiver.

12. A method for providing position location information (PLI) to a smart device, comprising the steps of:
 a) receiving and deriving PLI satellite signals utilizing a GPS receiver;
 b) providing a GPS originated analog audio signal from said derived PLI utilizing a signal interpreting device, said signal interpreting device comprising a digital to analog converter (DAC) to produce said GPS originated analog audio signal and an analog to digital converter (ADC) to consume a smart device originated analog audio signal; and,
 c) receiving said GPS originated analog audio signal utilizing a GPS device interface, said GPS device interface configured to directly transmit said analog audio signal to a smart device, said GPS device interface connected via an audio connector adapted for use with an audio interface of the smart device.

13. The method of claim 12, wherein said GPS device interface is adapted to receive said smart device originated analog audio signal from said smart device, said smart device originated analog audio signal being converted to a smart device originated PLI request.

14. The method of claim 12, wherein said GPS device interface is adapted to receive said smart device originated analog audio signal from said smart device, said smart device originated analog audio signal being converted to a smart device originated data acknowledgement.

15. The method of claim 12, wherein said GPS device interface is adapted to receive said smart device originated analog audio signal from said smart device, said smart device originated analog audio signal being converted to a smart device originated PLI request and data acknowledgment.

16. The method of claim 12, wherein said global positioning system (GPS) device interface further includes said audio connector connectable to said smart device.

* * * * *